United States Patent
Ben Salah et al.

(10) Patent No.: US 11,760,181 B2
(45) Date of Patent: Sep. 19, 2023

(54) ASSEMBLY FOR SECURING A VEHICLE BATTERY ON A BODY OF A MOTOR VEHICLE AND METHOD FOR MOUNTING A VEHICLE BATTERY IN A MOTOR VEHICLE

(71) Applicant: Bayerische Motoren Werke Aktiengesellschaft, Munich (DE)

(72) Inventors: Semi Ben Salah, Finsing (DE); Josef Braun, Feldkirchen-Westerham (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 354 days.

(21) Appl. No.: 17/057,524

(22) PCT Filed: Jul. 8, 2019

(86) PCT No.: PCT/EP2019/068231
§ 371 (c)(1),
(2) Date: Nov. 20, 2020

(87) PCT Pub. No.: WO2020/025256
PCT Pub. Date: Feb. 6, 2020

(65) Prior Publication Data
US 2021/0206252 A1    Jul. 8, 2021

(30) Foreign Application Priority Data
Aug. 3, 2018   (DE) ................... 10 2018 213 009.4

(51) Int. Cl.
*B60K 1/02*   (2006.01)
*B60K 1/04*   (2019.01)
*B62D 27/06*  (2006.01)

(52) U.S. Cl.
CPC .............. *B60K 1/04* (2013.01); *B62D 27/065* (2013.01); *B60K 2001/0438* (2013.01)

(58) Field of Classification Search
CPC .... B60K 1/04; B60K 2001/0438; B60K 1/02; B62D 27/065
See application file for complete search history.

(56) References Cited

U.S. PATENT DOCUMENTS 8,336,658 B2    12/2012  Rawlinson et al.
9,159,970 B2 *  10/2015  Watanabe ........... H01M 10/613
(Continued)

FOREIGN PATENT DOCUMENTS

DE    10 2010 011 890 A1    9/2011
DE    10 2015 003 643 B3    6/2016
(Continued)

OTHER PUBLICATIONS

International Search Report (PCT/ISA/210) issued in PCT Application No. PCT/EP2019/068231 dated Oct. 24, 2019 with English translation (seven (7) pages).
(Continued)

*Primary Examiner* — Jason D Shanske
*Assistant Examiner* — James J Triggs
(74) *Attorney, Agent, or Firm* — Crowell & Moring LLP

(57) ABSTRACT

An assembly for securing a vehicle battery on a body of a motor vehicle, includes a securing device releasably secured on a body part of the vehicle body and an adhesive material. The adhesive material is arranged between a housing of the vehicle battery and the securing device in order to connect the housing to the securing device by way of a material bond. The adhesive material is arranged over a retention element portion of a retention element.

13 Claims, 4 Drawing Sheets

(56) References Cited

U.S. PATENT DOCUMENTS

| | | | |
|---|---|---|---|
| 9,227,582 B2* | 1/2016 | Katayama | H01M 50/24 |
| 9,926,017 B1* | 3/2018 | Hamilton | B62D 25/20 |
| 11,038,236 B2* | 6/2021 | Montgomery | H01M 50/244 |
| 11,155,150 B2* | 10/2021 | Stephens | B60K 11/02 |
| 2008/0136110 A1 | 6/2008 | He | |
| 2010/0294580 A1* | 11/2010 | Kubota | H01M 10/625 |
| | | | 180/68.1 |
| 2016/0288636 A1 | 10/2016 | Kamimura et al. | |
| 2017/0305250 A1 | 10/2017 | Hara | |
| 2018/0281577 A1 | 10/2018 | Acikgoez et al. | |
| 2019/0207181 A1 | 7/2019 | Raepple | |
| 2020/0009957 A1 | 1/2020 | Grosse et al. | |
| 2021/0095737 A1* | 4/2021 | Oblizajek | B60K 5/12 |
| 2021/0163076 A1* | 6/2021 | Schlesinger | B62D 27/04 |
| 2021/0184191 A1* | 6/2021 | White | H01M 50/20 |
| 2022/0013965 A1* | 1/2022 | Fernandes | H01R 13/052 |
| 2022/0376331 A1* | 11/2022 | Roller | H01M 50/244 |

FOREIGN PATENT DOCUMENTS

| | | |
|---|---|---|
| DE | 11 2014 005 490 T5 | 8/2016 |
| DE | 10 2015 015 744 A1 | 6/2017 |
| DE | 10 2016 219 242 A1 | 4/2018 |
| DE | 10 2017 206 650 A1 | 10/2018 |
| EP | 2 910 394 A1 | 8/2015 |
| EP | 2 371 599 B1 | 9/2016 |

OTHER PUBLICATIONS

German-language Written Opinion (PCT/ISA/237) issued in PCT Application No. PCT/EP2019/068231 dated Oct. 24, 2019 (six (6) pages).

German-language Search Report issued in German Application No. 10 2018 213 009.4 dated Jun. 17, 2019 with partial English translation (11 pages).

\* cited by examiner

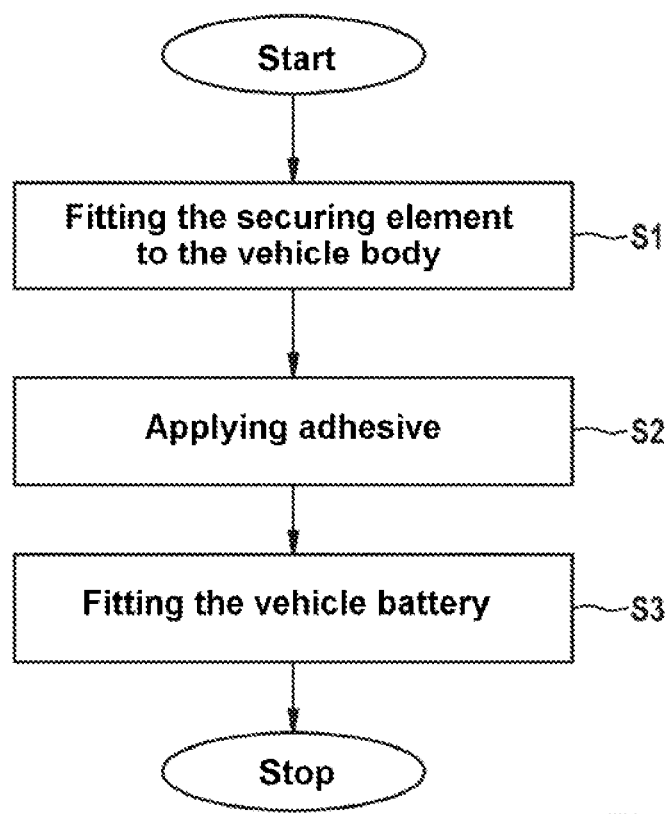

ASSEMBLY FOR SECURING A VEHICLE BATTERY ON A BODY OF A MOTOR VEHICLE AND METHOD FOR MOUNTING A VEHICLE BATTERY IN A MOTOR VEHICLE

BACKGROUND AND SUMMARY OF THE INVENTION

The invention relates to electrically operable motor vehicles, and in particular motor vehicles having vehicle batteries for the traction drive. Furthermore, the present invention relates to measures and devices for securing the vehicle battery to a body of a motor vehicle.

Electrically operable motor vehicles generally require a vehicle battery as an electrical energy store for the traction. As a result of the required capacity, the vehicle battery has large structural dimensions and a high weight and is therefore often secured to the underbody of the vehicle body below the passenger compartment. As a result of the compact nature of conventional vehicle batteries, they also often contribute to the mechanical stabilization of the frame of the vehicle body between the front axle and rear axle.

Since the vehicle battery is arranged below the passenger compartment, for reasons of comfort the height of the vehicle battery is limited. As a result of the high volume of the battery cells, such a vehicle battery extends in a lateral direction virtually over the entire vehicle width and the spacing between the front axle and the rear axle.

The vehicle battery has for securing to the vehicle body a peripheral securing flange, by means of which the vehicle battery is screwed or otherwise secured to the underbody of the vehicle body. As a result of its high weight and planar configuration, however, such an arrangement of the vehicle battery may lead during operation of the motor vehicle to low-frequency vibrations which are perceived to be unpleasant. A common solution to prevent such vibrations is provided by securing the vehicle battery to the vehicle body by means of the housing cover thereof.

Therefore, U.S. Pat. No. 8,336,658 B2 discloses a vehicle battery having internal through-openings which extend through the storage space. A fixing of the vehicle battery is achieved using screws which are inserted into the through-openings. However, such through-openings represent weak points of the housing of the vehicle battery which can only be sealed with a very high level of complexity with respect to the penetration of dirt or moisture. Often, such a solution is not resistant to ageing and is not corrosion-resistant.

As a result of the arrangement and structural height of the vehicle battery, reinforcement structures in the base region of the vehicle body are generally reduced. The reduced rigidity of the vehicle body may lead to low-frequency vibrations which can be further amplified by components which are arranged in a manner capable of vibration.

Furthermore, there is the problem that, during the initial assembly of the motor vehicle, access to the passenger inner space is not possible or is possible only with disruption of the production process so that the provision of a securing of the vehicle battery with its upper side of the housing on the body carrier of the vehicle body is not readily possible. In addition, in order to replace or to maintain the vehicle battery, it must be possible to release it from the body in a simple manner after the initial assembly.

An object of the present invention is to provide an improved securing method for a vehicle battery, by means of which the vehicle battery can also be secured to the body without flanges via a housing side. In this instance, the securing should be provided in such a manner that, during initial assembly, no assembly step for fitting the vehicle battery to the vehicle body has to be carried out via the inner side of the passenger compartment, but subsequent removal for maintenance or replacement is possible.

STATEMENT OF INVENTION

This object is achieved with a securing arrangement for a vehicle battery in a motor vehicle, a body arrangement of a motor vehicle and a method for mounting and removing a vehicle battery in a motor vehicle, according to the independent claims. Other embodiments are set out in the dependent claims.

According to a first aspect, a securing arrangement for securing a vehicle battery to a vehicle body is provided, comprising: a securing device for releasably securing to a body portion of the vehicle body; an adhesive material which is arranged between a housing of the vehicle battery and the securing device in order to connect the housing and the securing device to each other using a materially engaging connection, wherein the adhesive material is arranged above a retention element portion of a retention element.

An aspect of the above securing arrangement involves forming it with a securing device which is releasably secured to the vehicle body prior to the initial assembly of the vehicle battery. The securing device is constructed in such a manner that it enables a materially engaging connection of the vehicle battery to the vehicle body. The connection of the vehicle battery to the vehicle body is carried out in this instance by simply placing the vehicle battery on the vehicle body, wherein the vehicle battery is moved in the direction of the vehicle body. If the vehicle battery is in the mounting position thereof, the vehicle battery and the securing device are permanently adhesively bonded to each other by an adhesive material which is introduced between the housing of the vehicle battery and the securing device producing an adhesive connection. Consequently, during the insertion of the vehicle battery into the mounting position thereof, a connection between the housing and the securing device and consequently between the vehicle body and the housing of the vehicle battery can be readily produced.

The application of the adhesive material over the retention element portion of the retention element seals the housing of the vehicle battery in the region of the retention element portion with respect to the environment. This may be necessary particularly when the retention element extends through a through-opening into the inner side of the vehicle battery and it thereby represents a potential leakage location. The application of the adhesive material to the retention element portion enables sealing of a potential leakage location. Consequently, the adhesive material performs the function, on the one hand, of fixing the vehicle battery to the vehicle body in a simple manner and, on the other hand, of sealing the vehicle battery with respect to environmental influences.

Furthermore, a securing element for securing to the housing of the vehicle battery may be provided, wherein the adhesive material is arranged between the securing element and the securing device in order to connect the securing element and the securing device to each other in a materially engaging manner, wherein the adhesive material is arranged above a retention element portion of a retention element which fixes the securing element to the vehicle battery.

The securing element and the securing device are constructed in such a manner that they are connected to each other in a materially engaging manner by means of an adhesive connection when the vehicle battery is mounted on the vehicle body. The connection of the vehicle battery to the vehicle body is carried out by simply placing the vehicle battery on the vehicle body after previously applying an adhesive material between the securing element and the securing device. As a result of the adhesive connection, the vehicle battery can be reliably secured to the vehicle body or some other securing can be supported. Consequently, a vehicle battery can be mounted on the vehicle body in a simple manner.

For example, by screwing the vehicle battery to the vehicle body, the vehicle battery can be moved along the securing flange on the housing edge of the vehicle battery into the mounting position. By tightening the screw connection of the vehicle battery to the vehicle body, the securing device is pressed against the securing element and the adhesive connection is thereby produced between the securing element and the securing device.

If the vehicle battery is intended to be removed from the vehicle body, there is provision for the securing device which is releasably fitted to the vehicle body to be released by acting from inside the passenger compartment.

To this end, prior to initial assembly of the vehicle battery, the securing device is releasably secured beforehand to the vehicle body from the passenger compartment and constitutes after the initial assembly the way of releasing the vehicle battery together with the securing device from the vehicle body again.

In this manner, a securing arrangement which enables initial assembly of the vehicle battery without access to the passenger compartment can be provided. After the initial assembly, the securing arrangement can be released since it is connected to the vehicle body in particular by means of the releasable connection.

On the whole, such a securing arrangement enables particularly simple initial assembly without considerable structural space having to be provided for the securing arrangement.

In addition, the application of the adhesive material to the retention element in order to secure the securing device enables a portion of the retention element which is accessible from the side of the securing device facing away from the vehicle battery not to be at risk of corrosion since it is completely surrounded by the adhesive material. As a result of the central application of the adhesive material to a portion of the retention element which extends through the securing device, the requirement involving the placement of the adhesive material is small and consequently simple to implement in a production operation.

Furthermore, the securing element which is constructed in the form of a securing plate may have a through-opening for receiving a retention element portion of a retention element.

There may be provision for the adhesive material to completely surround the retention element portion and thereby to seal the retention element portion with respect to the environment.

According to an embodiment, the securing device may have a recess in the direction of the vehicle body, wherein the recess is constructed opposite the retention element portion.

Furthermore, a protective material may be provided between the retention element portion and the adhesive material in order to prevent adhesion of the retention element portion to the adhesive material. As a result of the protective material, it is possible to prevent the outer contour of the retention element portion from being impaired by the adhesive material or from becoming clogged with adhesive material and/or the retention element from becoming adhesively bonded to the securing device in such a manner that the securing of the securing device to the vehicle battery cannot be released or can be released only with a very high application of force.

There may be provision for the securing element which is constructed in the form of a securing plate to have a through-opening for receiving a retention element portion of a retention element.

In particular, the protective material may have a covering element for placing on the retention element portion.

According to an embodiment, the securing device may have, at the side to which adhesive has been applied, a circumferential edge which protrudes in the direction of the securing element.

Furthermore, the securing device may have, at the side to which adhesive material has been applied, a coating which can be released under the action of heat.

In order to release the assembled vehicle battery, the securing element is released from the vehicle body. By subsequently carrying out a thermal processing operation, the securing element can now be released from the cured adhesive material. This is carried out in particular by providing a coating of the securing element at the side to which adhesive material has been applied so that, as a result of the action of heat, the coating is released from the securing element and subsequently the cured adhesive material can be removed from the securing device. As a result of additional protection of the retention element portion by a protective material with which the retention element portion is provided before the adhesive material is applied to the retention element portion, a connection of the adhesive material to the retention element portion can be prevented so that the retention element portion is not impaired. This is particularly advantageous since the retention element, in addition to retaining the securing device, is also required to open the vehicle battery and consequently has to be released using a tool in order to reach the inner side of the vehicle battery.

According to an embodiment, the securing device may have a device for a screw connection to the vehicle body, in particular a thread or a threaded bolt.

According to another aspect, a body arrangement is provided having a vehicle body, a vehicle battery and the above securing arrangement which are arranged between a housing side of the vehicle battery and a body portion of the vehicle body, wherein the securing arrangement is constructed in order, when the vehicle battery is moved into a mounting position on the vehicle body, to permanently connect the securing element to the securing device.

Furthermore, the securing element may be connected to the vehicle battery by means of a screw connection.

There may be provision for the securing device to be connected to the body portion of the vehicle body by means of a screw connection, wherein the screw connection can be released from the passenger compartment of the vehicle body.

According to another aspect, a method for mounting a vehicle battery on a vehicle body is provided, having the following steps of:

releasably securing a securing device to a body portion of the vehicle body;

introducing adhesive material between the securing device and a housing of the vehicle battery in order to connect the vehicle battery and the securing device to each other in a materially engaging manner, wherein the adhesive material is arranged above a retention element portion of a retention element; and positioning the vehicle battery in a mounting position on the vehicle body, wherein the securing element is pressed against the securing device and an adhesive connection is produced.

A securing element may be secured to the housing of the vehicle battery, wherein the adhesive material is introduced between the securing element and the securing device in order to connect the securing element and the securing device to each other in a materially engaging manner, wherein the adhesive material is introduced via a retention element portion of a retention element which fixes the securing element to the vehicle battery.

Furthermore, the vehicle battery can be moved into the mounting position on the vehicle body by screwing the vehicle battery to the vehicle body along a securing flange on the housing edge of the vehicle battery.

BRIEF DESCRIPTION OF THE DRAWINGS

Embodiments are explained in greater detail below with reference to the appended drawings.

BRIEF DESCRIPTION OF THE DRAWINGS

Figure 1:
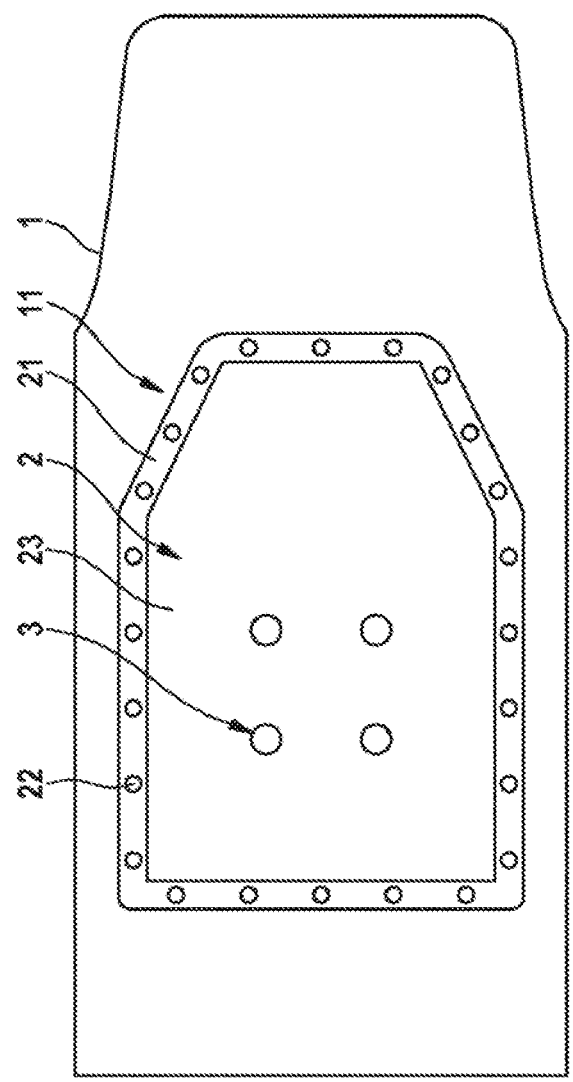

FIG. 1 is a view of a vehicle body with a mounted vehicle battery from below.

Figure 2:
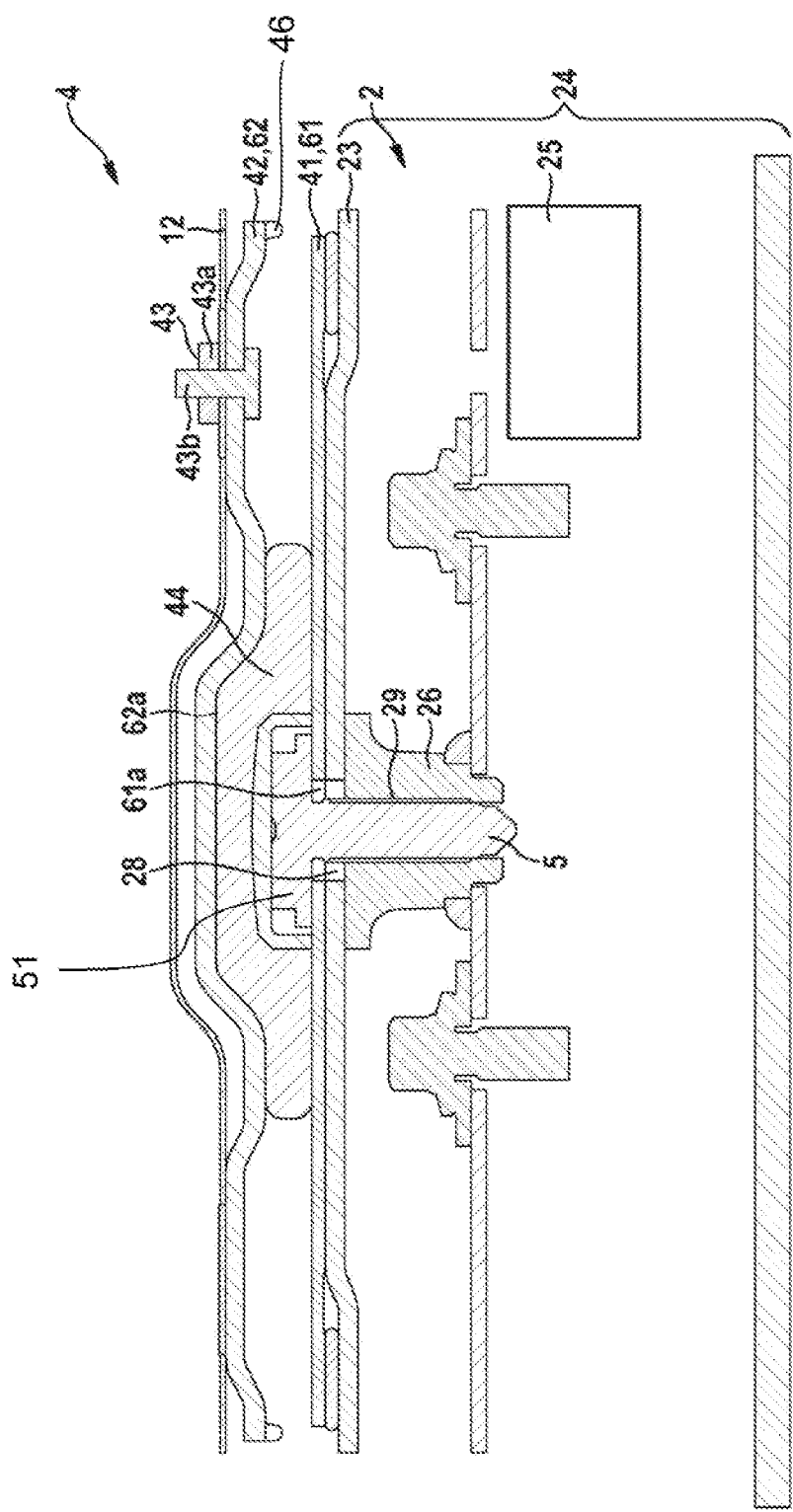

FIG. 2 is a sectioned view through a securing arrangement for securing a vehicle battery to a vehicle body by means of an adhesive connection.

Figure 3:
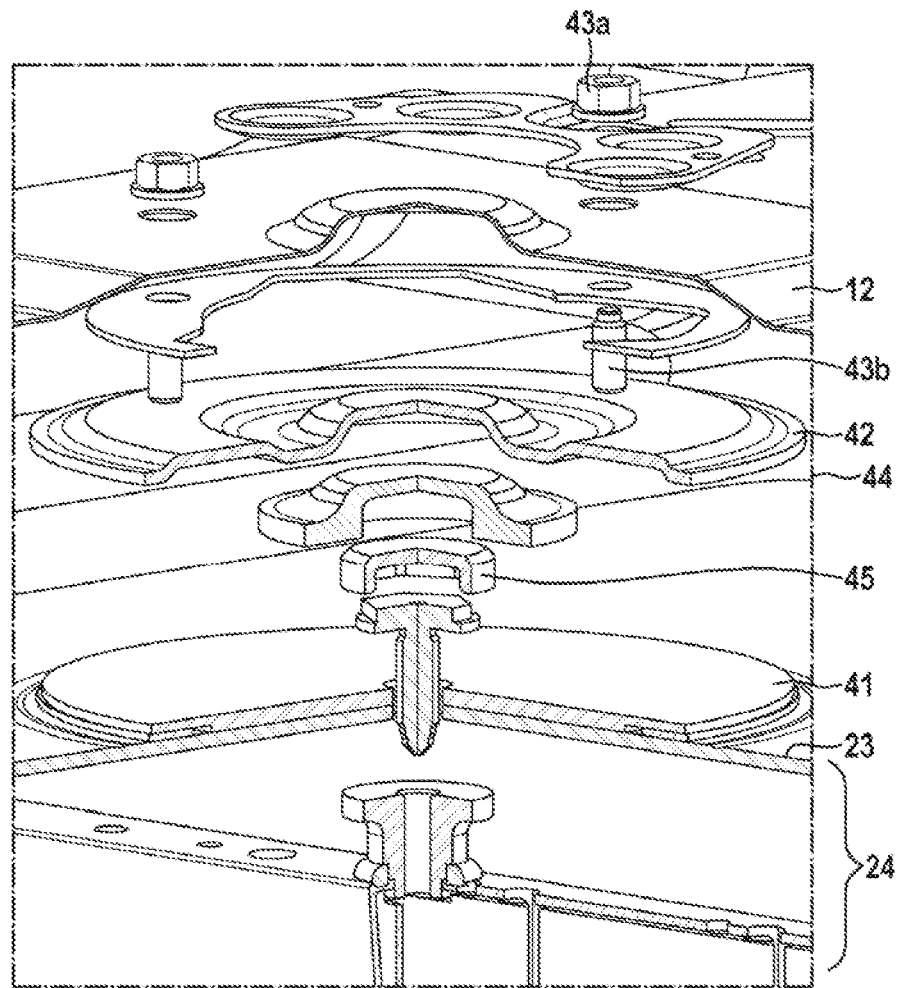

FIG. 3 is an exploded illustration of the securing arrangement for securing the vehicle battery to the vehicle body by means of an adhesive connection.

FIG. 4 is a method flow chart for illustrating the method steps for the initial assembly of the vehicle battery on the vehicle body.

DETAILED DESCRIPTION OF THE DRAWINGS

FIG. 1 is a view from below of a vehicle body 1 of a motor vehicle having a mounted vehicle battery 2. It is possible to see the vehicle body 1 which has a recess 11 in order to receive the vehicle battery 2. The vehicle battery 2 is constructed with a thickness between 10 and 30 cm and therefore has lateral dimensions which take up a large proportion of the length between the positions of the front axle and rear axle of the motor vehicle and a large proportion of the width of the vehicle body 1.

The vehicle battery 2 has a completely or partially circumferential securing flange 21 which surrounds the housing of the vehicle battery 2 at the side (lateral face) thereof. Via the securing flange 21, the vehicle battery 2 can be connected to the vehicle body 1 by means of releasable connections, in particular by means of screw connections 22. In order to prevent vibrations, there is provision for a fixing to be provided between a body portion 12 (see FIG. 2) in the recess 11 of the vehicle body 1 and a housing side 23 (side perpendicular to the thickness direction) of the vehicle battery 2 so that vibration of the vehicle battery 2 or the body portion of the vehicle body 1 can be prevented in a region which is surrounded by the securing flange 21.

FIG. 2 is a cross-section through a cut-out of a motor vehicle having a securing arrangement 4 and FIG. 3 is an exploded view of the securing arrangement 4. Using the securing arrangement 4, the vehicle battery 2 is secured with the housing side 23 thereof, which may be formed by a housing cover, to a body portion 12 of the vehicle body 1. The securing arrangement 4 may be used to exclusively or additionally fix the vehicle battery 2 to the body portion 12 in an inner region which is spaced apart from the edge of the vehicle battery 2 and to which during initial assembly of the vehicle battery 2 there is no access from a side of the vehicle body 1 facing the mounting position of the vehicle battery 2.

A housing 24 of the vehicle battery 2 surrounds battery cells 25 which are retained in a frame with a reinforcement profile 26. The housing side 23 is retained on the reinforcement profile 26 by means of a first screw connection using a screw 5. The screw 5 represents a retention element and may also be constructed in a form other than a screw as a releasable securing. The screw 5 leads from the outer side through a screw opening 28 of the housing side 23 and can be screwed into a corresponding thread 29, for example, of the reinforcement profile 26 inside the housing 24. The reinforcement profile 26 may abut an inner side of the housing side 23 in order to protect the inner side of the vehicle battery 2 against the penetration of dirt or moisture through the screw opening 28.

At the outer side of the housing side 23, a securing element 41 of the securing arrangement 4 may be arranged at the housing side 23 and may be connected thereto, for example, by means of welding, adhesive bonding or the like. The screw 5 may lead through a through-opening 61a of the securing element 41 and additionally connect the securing element 41 to the housing side 23 of the vehicle battery 2. In an alternative embodiment, no securing element 41 may be provided.

There is provided a securing device 42 which is connected by means of a releasable connection 43, such as, for example, a screw connection with one or more screws, to the body portion 12 of the vehicle body 1. The screw connection 43 can preferably be released from the passenger compartment. In order to release the screw connection 43, a screw nut 43a on a screw bolt 43b can be released.

In the present embodiment, the securing element 41 and the securing device 42 are constructed as a first or second securing plate 61, 62 which, in the mounted state of the vehicle battery 2, that is to say, in the mounting position thereof, are located opposite each other. The securing plate 62 may, in the direction of the body portion 12 of the vehicle body, have a recess 62a, in particular in the region of a screw head 51 of the screw 5 (retention element) which is arranged as a retention element portion at the side of the securing element 41 facing the securing device 42.

In the state in which the securing element 41 is connected to the securing device 42, there is applied via the screw head 51 of the screw 5 adhesive material 44 which completely surrounds and covers the screw head 51 and which is received in the recess 62a of the securing device 42 or the second securing plate 62. The securing arrangement 4 illustrated enables the vehicle battery 2 to be fitted to the vehicle body 1 during initial assembly without access being required to the passenger compartment when the vehicle battery 2 is fitted.

The assembly steps are illustrated in FIG. 4 with reference to a flow chart. Initially in step S1, the securing device 42 is fitted to the body portion 12 of the vehicle body. This is carried out by means of a releasable connection 43, in particular using screw connections 43a, 43b.

In step S2, adhesive material 44 is applied to the securing element 41 or the securing device 42. If the adhesive material is applied to the securing element 41, it is intended to completely cover the screw head 51 of the screw 5 so that, when the securing element 41 is placed on the securing device 42, the adhesive comes into contact with the securing device and in particular is received in the corresponding recess 62a which is opposite the screw head 51. When the vehicle battery 2 is positioned, the adhesive material 44 is thereby compressed so that it is distributed around the screw head 51 and over the screw head 51 between the securing plates 61, 62. Alternatively, the adhesive material 44 may also be introduced into the recess 62a of the second securing plate 62 so that the adhesive material 44 when the vehicle battery 2 is positioned comes into contact with the screw head 51 and the environment thereof. In this manner, the securing plates 61, 62 are connected to each other by means of the adhesive material 44.

In the embodiment without the securing element 41 or securing plate 61, the adhesive material comes into direct contact with the housing 24, wherein the screw head 51 of the screw 5 is completely surrounded. The housing 24 is thereby directly adhesively bonded to the securing device 42 or the second securing plate 62.

After the adhesive material 44 has cured, a materially engaging connection of the vehicle body 1 and the vehicle battery 2 is achieved.

To this end, in step S3, the vehicle battery 2 which is provided with the securing element is moved into a mounting position and fixed at that location by screwing the securing flange to the vehicle body 1. When the vehicle battery 2 is fitted to the vehicle body 1, the securing element 41 is pressed against the securing device 42 and, depending on the type of the connection device, the materially engaging connection is thereby readily produced by the adhesive material. This enables vibrations of the body portion 12 of the vehicle body 1 and/or the vehicle battery 2 to be able to be prevented or absorbed by the adhesive connection.

The securing device 42 can be provided with an outer edge 46 which protrudes in the direction of the securing element in order to ensure that, when the vehicle battery 2 is fitted to the body portion 12 of the vehicle body 1, the initially fluid or viscous adhesive does not reach a location outside the region of the securing device 42 and provides a direct non-releasable connection between the body portion 12 of the vehicle body 1 and the securing arrangement 4 or the housing side 23 of the vehicle battery 2.

In order to release the vehicle battery 2 after initial assembly, the screw connections 43 of the securing device 42 to the body portion 12 of the vehicle body 1 can be released and the entire securing arrangement 4 can thus be removed with the vehicle battery 2 from the vehicle body 1.

In order to open the vehicle battery 2, in particular for the maintenance or repair thereof, it is necessary to release the screw 5. In order to reach the screw head of the screw 5, after disassembly of the vehicle battery 2 by releasing the screw connection 43 the securing device 42 is now released from the cured adhesive material by means of a thermal processing operation. To this end, the adhesive material 44 can either be formed in order to break down the adhesive action by the action of heat or the securing device 42 or the second securing plate 62 can be provided at the side facing the securing element 41 with a coating which is released from the material of the securing device 42 by the action of heat and which thus enables the securing device 42 to be removed from the vehicle battery 2 which is released from the vehicle body 1.

The coating of the second securing plate 62 may comprise a cathode dip painting coating or another coating which in a normal temperature range is securely connected to the securing plate 62 so that the adhesive connection to the adhesive material 44 reliably retains the vehicle battery 2 on the body portion 12. Only under the action of heat is the coating released from the second securing plate 62 and the previously secure fixing of the securing element 41 to the securing device 42 is broken down.

After the release of the securing device 42, the cured adhesive material 44 is free and can be removed or detached from the securing element 41 using an appropriate method.

In order to protect the screw 5 or the screw head 51 from the adhesive material 44, in particular so that the screw head 51 is still able to be released using a suitable tool in order to obtain access to the inner side of the vehicle battery 2, prior to application of the adhesive material 44 a protective material 45 can be applied to the screw head 51. In this manner, the adhesive material 44 cannot come into direct contact with the screw head 51 so that there is no materially engaging connection between the adhesive material 44 and the screw head 51. When the adhesive material 44 is removed, the screw head 51 is consequently unimpeded by the adhesive material 44 and can readily be processed with a suitable tool in order to release the screw 5.

The protective material may be a material which can be applied and which prevents a connection between the adhesive material 44 and the screw head 51. Alternatively, the protective material 45 may be constructed in the form of a covering cap 45a which can be placed on the screw head 51 in order to surround it.

The covering cap 45a over the screw head 51 may, for example, be a metal cover or a plastics material cover which preferably completely surrounds the screw head 51, that is to say, it rests on the region of the securing element 41 surrounding the screw head 51. Alternatively, the screw head 51 may also be coated with a protective material which prevents bonding of the adhesive material 44 to the screw head 51.

LIST OF REFERENCE NUMERALS

1 Vehicle body
11 Recess
12 Body portion
15 Access opening
2 Vehicle battery
21 Securing flange
22 Screw connections
23 Housing side
24 Housing
25 Battery cells
26 Reinforcement profile
27 Spacing sleeve
28 Screw opening
29 Thread
4 Securing arrangement
41 Securing element
42 Securing device
43 Releasable connection
43a Screw nut
43b Screw bolt
44 Adhesive material
45, 45a Protective material, covering cap
46 Protruding outer edge
5 Screw
51 Screw head
61, 62 Securing plates
61a Through-opening
62a Recess

What is claimed is:

1. A securing arrangement for securing a vehicle battery to a vehicle body, comprising:

a securing device releasably securable to a body portion of the vehicle body;

an adhesive material arranged between a housing of the vehicle battery and the securing device in order to connect the housing and the securing device to each other via a materially engaging connection, wherein the adhesive material is arranged above a retention element portion of a retention element.

2. The securing arrangement according to claim 1, further comprising:

a securing element securable to the housing of the vehicle battery, wherein the adhesive material is arranged between the securing element and the securing device in order to connect the securing element and the securing device to each other in a materially engaging manner, and the adhesive material is arranged above the retention element portion of the retention element, the retention element being configured to fix the securing element to the vehicle battery.

3. The securing arrangement according to claim 2, wherein the securing element is constructed in the form of a securing plate having a through-opening for receiving the retention element portion of the retention element.

4. The securing arrangement according to claim 1, wherein the adhesive material completely surrounds the retention element portion and thereby seals the retention element portion with respect to the environment.

5. The securing arrangement according to claim 1, wherein the securing device has a recess in a direction of the vehicle body, and the recess is constructed opposite the retention element portion.

6. The securing arrangement according to claim 1, further comprising:

a protective material provided between the retention element portion and the adhesive material in order to prevent adhesion of the retention element portion to the adhesive material.

7. The securing arrangement according to claim 6, wherein the protective material comprise a cover placeable on the retention element portion.

8. The securing arrangement according to claim 1, wherein the securing device has, on a side to which adhesive has been applied, a circumferential edge which protrudes in the direction of the housing or a securing element.

9. The securing arrangement according to claim 1, wherein the securing device has, on a side to which adhesive material has been applied, a coating which is releasable under action of heat.

10. The securing arrangement according to claim 1, wherein the securing device includes a screw connection to the vehicle body.

11. A body arrangement, comprising:

a vehicle body;

a vehicle battery; and a securing arrangement according to claim 1, wherein the securing arrangement is between a housing side of the vehicle battery and a body portion of the vehicle body, and the securing arrangement is constructed in order, when the vehicle battery is moved into a mounting position on the vehicle body, to permanently connect the housing to the securing device.

12. The body arrangement according to claim 11, wherein a securing element is securing to the housing of the vehicle battery, the adhesive material is arranged between the securing element and the securing device in order to connect the securing element and the securing device to each other in a materially engaging manner, the adhesive material is arranged above a retention element portion of a retention element which fixes the securing element to the vehicle battery, and the securing element is connected to the vehicle battery by a screw connection.

13. The body arrangement according to claim 12, wherein the securing device is connected to the body portion of the vehicle body by a screw connection, and the screw connection is releasable from a passenger compartment of the vehicle body.

* * * * *